June 15, 1965     W. J. FRIERDICH     3,189,813

D.C. TO QUASI-SQUARE WAVE TRANSISTOR INVERTER

Filed Oct. 6, 1961

QUASI SQUARE WAVE OUTPUT

INVENTOR.
WALDO J. FRIERDICH

BY
*Alfred W. Petchaft*

ATTORNEY

3,189,813
D.C. TO QUASI-SQUARE WAVE TRANSISTOR INVERTER

Waldo J. Frierdich, Highland, Ill., assignor to Basler Electric Company, Highland, Ill., a corporation of Illinois
Filed Oct. 6, 1961, Ser. No. 143,352
5 Claims. (Cl. 321—45)

This invention relates in general to inverters and, more particularly, to a transistorized-inverter for generating a quasi square wave output from a direct current input.

One of the convenient and often employed methods of changing direct current into alternating current is to feed these direct currents into some type of switching device which will cause current to flow in one direction in the output circuit for a selected interval of time and then reverse the flow of current in the output line for an equal succeeding period of time. Such devices will produce a square wave output which, for most practical purposes, has the electrical characteristics of, and substantially resembles, sinusoidal alternating current.

However, for certain purposes, it would be desirable to utilize an output in which the current flows in opposite directions for equal successive intervals which are spaced by additional equal intervals during which the current is at zero potential. Such an output has a wave form which can be referred to as quasi square wave output. It would also be desirable to achieve this result by the use of transistorized bridge circuitry.

It is, therefore, the primary object of the present invention to provide a transistorized bridge circuit which is capable of producing a quasi square wave output from a direct current input.

It is also an object of the present invention to provide a generating circuit of the type stated which is highly compact and is also comparatively economical in cost.

It is a further object of the present invention to provide a generating circuit of the type stated which is extremely efficient in operation and is capable of operating continuously over sustained periods of time without incurring substantial power losses.

It is also an object of the present invention to provide a generating circuit of the type stated which can be assembled from components of relatively moderate size and cost in relation to the magnitude of voltage and current to be handled in the system.

With the above and other objects in view, my invention resides in the novel features of form, construction, arrangement, and combination of parts presently described and printed out in the claims.

In the accompanying drawing (one sheet)—

Figure 1:
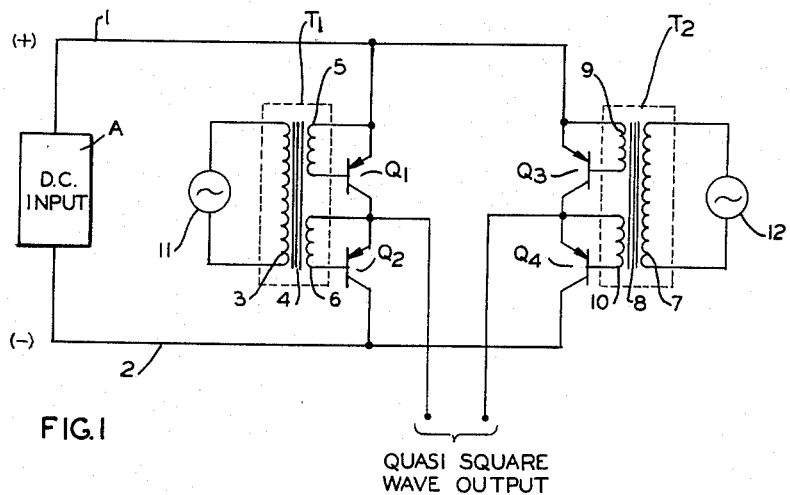
Figure 2:
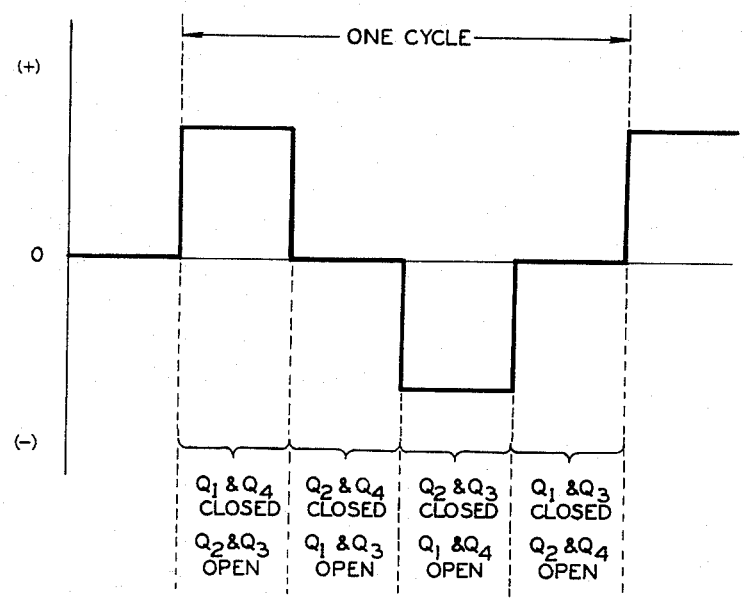

FIG. 1 is a schematic wiring diagram of a quasi square wave generator constructed in accordance with and embodying the present invention; and FIG. 2 is a graph diagrammatically illustrating the electrical operation of the present invention.

Referring now in more detail and by reference characters to the drawing, which illustrates a preferred embodiment of the present invention, A designates a conventional source of D.C. input, having positive and negative leads 1, 2. Also included in the generating circuit are two identical transformers $T_1$, $T_2$. The transformer $T_1$ includes a primary coil 3, a core 4, and secondary coils 5, 6, the latter having equal turns-ratios with respect to the primary coil 3. Similarly, the transformer $T_2$ includes a primary coil 7, a core 8, and secondary coils 9, 10, the latter also having equal turns-ratios with respect to the primary coil 7. Connected across the primary coil 3 of the transformer $T_1$ is a first square wave signal generator 11 and, similarly connected across the primary coil 7 of the transformer $T_2$ is a second square wave signal generator 12.

Connected across the leads 1, 2, is a transistor bridge consisting of four transistors $Q_1$, $Q_2$, $Q_3$, $Q_4$. As shown in FIG. 1, the emitters of transistors $Q_1$, $Q_2$, are connected to line 1 and the collectors of transistors $Q_2$, $Q_4$, are connected to line 2. The collector of transistor $Q_1$ and the emitter of transistor $Q_2$ are connected in common to one output line. Similarly, the collector of transistor $Q_3$ and emitter of transistor $Q_4$ are connected in common to the other output line. The secondary 5 is connected across the emitter and base of transistor $Q_1$. The secondary 6 is connected across the emitter and base of transistor $Q_2$. The secondary 9 is connected across the emitter and base of transistor $Q_3$. The secondary 10 is connected across the emitter and base of transistor $Q_4$.

The signal generator 11 furnishes a square wave signal which alternately causes the transistors $Q_1$, $Q_2$, to conduct and cutoff for identical intervals equal to half of the period of the square wave. Similarly, the signal generator 12 furnishes a second square wave which alternately causes transistors $Q_3$, $Q_4$, to conduct and cutoff for identical intervals equal to half of the period of such square waves. When the square waves from signal generators 11, 12, are in phase, the width of the positive and negative output pulses will become zero. When the square wave signals from the signal generators 11, 12, are out of phase the width of the pulses increase to one-half period length. Consequently, the circuitry of the present invention may be referred to as a staggered-phase bridge and will generate an output having the quasi square wave form shown in FIG. 2.

It should be understood that changes and modifications in the form, construction, arrangement, and combination of the several parts of the inverters may be made and substituted for those herein shown and described without departing from the nature and principle of my invention.

Having thus described my invention, what I claim and desire to secure by Letters Patent is:

1. An inverter adapted for generating a quasi-square wave output current; said inverter comprising a source of direct current having a positive lead and a negative lead, a first pair of transistors connected in series with each other and connected across the positive and negative leads; a first transformer having a single primary and two secondaries, one of said secondaries being connected across the emitter and base of one transistor of said pair, the other secondary being connected across the emitter and base of the other transistor of said pair, first signal generating means connected across the primary of the first transformer, a second pair of transistors connected in series with each other and connected across the positive and negative leads, a second transformer having a single primary and two secondaries, one of said secondaries of the second transformer being connected across the emitter and base of one transistor of said last-named pair, the other secondary of the second transformer being connected across the emitter and base of the other transistor in said last-named pair, and second signal generating means connected across the primary of the second transformer.

2. An inverter adapted for generating a quasi-square wave output current; said inverter comprising a source of direct current having a positive lead and a negative lead, a first pair of transistors connected in series with each other and connected across the positive and negative leads, a first transformer having a single primary and two secondaries, one of said secondaries being connected across the emitter and base of one transistor of said pair, the other secondary being connected across the emitter and base of the other transistor of said pair, first signal generating means connected across the primary of the first transformer, a second pair of transistors connected in series with each other and connected across the positive and negative leads, a second transformer having a single primary and two secondaries, one of said secondaries of the second transformer being connected across the emitter and base of one transistor of said last-named pair, the other secondary of the second transformer being connected across the emitter and base of the other transistor in said last-named pair, second signal generating means connected across the primary of the second transformer, a first output lead connected to the series connection between the first pair of transistors, and a second output lead connected to the series connection between the second pair of transistors.

3. An inverter adapted for generating a quasi-square wave output current; said inverter comprising a source of direct current having a positive lead and a negative lead, a first pair of transistors connected in series with each other and connected across the positive and negative leads, a first transformer having a single primary winding and two secondaries, said secondaries being respectively connected across the emitters and bases of said transistors, first signal generating means connected across the primary of the first transformer, a second pair of transistors connected in series with each other and connected across the positive and negative leads, a second transformer having a single primary winding and two secondaries, said secondaries being respectively connected across the emitters and bases of said transistors, and second signal generating means connected across the primary of the second transformer, one of said first pair of transistors and one of said second pair of transistors being in a conductive state while the other of said first pair of transistors and the other of said second pair of transistors are in a non-conductive state during a portion of the current cycle.

4. An inverter adapted for generating a wave output current having a positive output pulse followed by a pulse of zero potential, followed by a negative output pulse and followed by a pulse of zero potential in a single cycle; said inverter comprising a source of direct current having a positive lead and a negative lead, a first pair of transistors connected in series with each other and connected across the positive and negative leads, a first transformer having a single primary winding and two secondaries, said second secondaries being respectively connected across the emitters and bases of said transistors, first signal generating means connected across the primary of the first transformer, a second pair of transistors connected in series with each other and connected across the positive and negative leads, a second transformer having a single primary winding and two secondaries, said secondaries being respectively connected across the emitters and bases of said transistors, and second signal generating means connected across the primary of the second transformer.

5. An inverter adapted for generating a wave output current having a positive output square wave pulse followed by a pulse of zero potential, followed by a negative output square wave pulse, and followed by a pulse of zero potential in a single cycle; said inverter comprising a source of direct current having a positive lead and a negative lead, a first pair of transistors connected in series with each other and connected across the positive and negative leads, a first transformer having a single primary winding and two secondaries, said secondaries being respectively connected across the emitters and bases of said transistors, first signal generating means connected across the primary of the first transformer, a second pair of transistors connected in series with each other and connected across the positive and negative leads, a second transformer having a single primary winding and two secondaries, said secondaries being respectively connected across the emitters and bases of said transistors, and second signal generating means connected across the primary of the second transformer.

References Cited by the Examiner
UNITED STATES PATENTS

| | | | |
|---|---|---|---|
| 2,821,639 | 1/58 | Bright | 323—22 |
| 2,862,171 | 11/58 | Freeborn | 321—45 |

FOREIGN PATENTS 1,244,219  9/60  France.

OTHER REFERENCES

Electrical Manufacturing—Design Techniques for Static Inverters, by A. A. Sorensen, January–February 1960.

LLOYD McCOLLUM, *Primary Examiner.*

GEORGE J. BUDOCK, *Examiner.*